United States Patent
Wan et al.

(10) Patent No.: US 10,769,192 B2
(45) Date of Patent: Sep. 8, 2020

(54) METHOD AND EQUIPMENT FOR DETERMINING COMMON SUBSEQUENCE OF TEXT STRINGS

(71) Applicant: BEIJING HANSIGHT TECH CO., LTD., Haidian (CN)

(72) Inventors: Xiaochuan Wan, Haidian (CN); Hanzhao Gao, Haidian (CN)

(73) Assignee: BEIJING HANSIGHT TECH CO., LTD., Beijing (CN)

( * ) Notice: Subject to any disclaimer, the term of this patent is extended or adjusted under 35 U.S.C. 154(b) by 256 days.

(21) Appl. No.: 15/770,486

(22) PCT Filed: Sep. 21, 2016

(86) PCT No.: PCT/CN2016/099631
§ 371 (c)(1),
(2) Date: Apr. 23, 2018

(87) PCT Pub. No.: WO2017/067364
PCT Pub. Date: Apr. 27, 2017

(65) Prior Publication Data
US 2019/0057148 A1    Feb. 21, 2019

(30) Foreign Application Priority Data
Oct. 21, 2015 (CN) .......................... 2015 1 0685864

(51) Int. Cl.
*G06F 16/35* (2019.01)
*G06F 16/00* (2019.01)
(Continued)

(52) U.S. Cl.
CPC .............. *G06F 16/35* (2019.01); *G06F 16/00* (2019.01); *G06F 16/325* (2019.01);
(Continued)

(58) Field of Classification Search
CPC ...... G06F 16/35; G06F 40/186; G06F 40/279; G06F 16/00; G06F 21/552; G06F 16/325; G06F 16/90344; G06F 40/194
See application file for complete search history.

(56) References Cited

U.S. PATENT DOCUMENTS 7,260,263 B1* 8/2007 Jafarkhani ........... G06K 9/6224
                                                             382/225
2002/0169770 A1* 11/2002 Kim ...................... G06F 16/355
(Continued)

FOREIGN PATENT DOCUMENTS

CN          101976318 A     2/2011

OTHER PUBLICATIONS

International Search Report and Written Opinion for International Application No. PCT/CN2016/099631, dated Nov. 29, 2016, 7 pages.

*Primary Examiner* — Cam Y T Truong
(74) *Attorney, Agent, or Firm* — Cherskov Flaynik & Gurda, LLC

(57) ABSTRACT

A method for determining a longest common subsequence in a plurality of text strings. The method comprises: separately converting a plurality of text strings into word sequences (S100); classifying the word sequences (S400); and performing longest common subsequence computation on every class (S500). The time needed by LCS computation can be saved by classifying text strings.

9 Claims, 3 Drawing Sheets

(51) Int. Cl.
  *G06F 21/55* (2013.01)
  *G06F 40/186* (2020.01)
  *G06F 40/279* (2020.01)
  *G06F 16/31* (2019.01)
(52) U.S. Cl.
  CPC .......... *G06F 21/552* (2013.01); *G06F 40/186* (2020.01); *G06F 40/279* (2020.01)

(56) References Cited

U.S. PATENT DOCUMENTS

| | | | |
|---|---|---|---|
| 2013/0041962 A1* | 2/2013 | Wang | H04L 51/12 |
| | | | 709/206 |
| 2014/0058540 A1 | 2/2014 | Lee | |
| 2014/0164376 A1* | 6/2014 | Yang | G06F 16/355 |
| | | | 707/737 |
| 2014/0344195 A1* | 11/2014 | Drew | G06F 16/35 |
| | | | 707/737 |
| 2015/0074507 A1* | 3/2015 | Riediger | G06K 9/723 |
| | | | 715/230 |
| 2016/0103831 A1* | 4/2016 | Khattar | G06F 16/35 |
| | | | 707/747 |

* cited by examiner

METHOD AND EQUIPMENT FOR DETERMINING COMMON SUBSEQUENCE OF TEXT STRINGS

CROSS REFERENCE TO RELATED APPLICATION(S)

This application is the U.S. national stage application under 35 U.S.C § 371 of International Patent Application No. PCT/CN2016/099631, filed on Sep. 21, 2016, claims the benefit of priority under 35 U.S.C § 119 of China Patent Application No. 201510685864.6, filed on Oct. 21, 2015, the contents of each which are hereby incorporated by reference in their entireties.

FIELD OF THE INVENTION

The present invention relates to the field of computer applications, and in particular to a method and equipment for determining a common subsequence of text strings.

BACKGROUND OF THE INVENTION

Nowadays, people pay more and more attention to network security, and various security devices including firewalls are widely used. However, only the deployment of security devices is not enough to protect the network security, relevant personnel also need to continuously monitor and analyse the logs generated by the security devices because the logs contain very valuable information. For example, they can use the logs to detect security threats such as network intrusions, virus attacks, abnormal behaviours, and abnormal traffic, so as to selectively configure and adjust the overall network security strategy.

One way to analyse logs is to classify log events into several categories such as "information", "error", and "warning". This method of analysis has limitations. Due to the large number and complexity of logs, important event information is likely to be submerged in the "warning" category and not processed in a timely manner. Therefore, in order to facilitate statistics, detect problems in a timely manner and avoid submerging small events of one type in other events of the same type, the logs need to be subdivided so that the type of event can be determined from the logs and processed accordingly.

The logs have a feature that they are in different formats based on differences in text and source. For example, there are differences between the formats of logs from firewalls and web servers. In addition, the logs can still be subdivided according to their meanings, even if the sources are the same.

The conventional method of subdividing the logs is to calculate the longest common subsequence (LCS), that is, to merge two log texts together and extract the common sequence part, so as to determine whether the two can be classified into one category. However, this conventional method only supports two texts. In the case of a plurality of log texts, any two of the texts need to be calculated, resulting in a very large amount of computation.

SUMMARY OF THE INVENTION

According to one aspect of the present invention, a method for determining the longest common subsequence among a plurality of text strings is provided, which comprises: converting a plurality of the text strings into word sequences respectively; converting the word sequences into corresponding word sets respectively; calculating the minimum hash value for each word set; classifying the word sequences according to the minimum hash value; and performing the longest common subsequence operation in each category.

In here and in the following content, the term "word sequence" refers to a sequence of words; correspondingly, the term "word set" refers to a set of words. Namely, the constituent elements of the sequence and the set are all words. The difference between the two is that the elements in the sequence can be repeated and must have an order, but in the set the order of the elements is not considered and the elements are not repeated.

According to another aspect of the present invention, an equipment for determining the longest common subsequence among a plurality of text strings is provided, which comprises: a first conversion device for converting a plurality of the text strings into word sequences respectively; a second conversion device for converting the word sequences into corresponding word sets respectively; a first operation device for calculating a minimum hash value for each word set; and a classification device for classifying the word sequences into categories according to the minimum hash value; and a second operation device for performing the longest common subsequence operation in each category.

The embodiments of the present invention may include one or more of the following features.

Two word sequences with a minimum hash distance less than a first threshold are classified into the same category.

The longest common subsequence operation includes: selecting a word sequence in the category as the first word sequence, and respectively calculating the longest common subsequences of the first word sequence with other word sequences in the category until the length of the longest common subsequence obtained is greater than a second threshold.

The longest common subsequence operation includes: deleting the first word sequence from the category if all the lengths of the longest common subsequences obtained are not greater than the second threshold, and continuing the longest common subsequence operation.

The longest common subsequence having a length greater than the second threshold is determined as a text string template.

The text string template is used to calculate the longest common sequence in turn with other word sequences in the category. During the calculation, the longest common subsequence having a length greater than the second threshold is determined as a new text string template and the calculation is continued.

The final text string template is output, and the word sequence in the category which can match the final text string template is deleted.

The longest common subsequence operation is continued until the category is empty.

Some embodiments of the present invention may have one or more of the following benefits: compared with conventional LCS algorithms, multiple texts are supported, and a minimum hash algorithm is used to quickly determine whether the differences between the texts are too large, thereby effectively saving the time required for the LCS operation.

Other aspects, features, and advantages of the present invention will be further clarified in the detailed description, drawings, and claims.

BRIEF DESCRIPTION OF THE DRAWINGS

The present invention will be further described below with reference to the accompanying drawings.

DETAILED DESCRIPTION OF THE INVENTION

Figure 1:
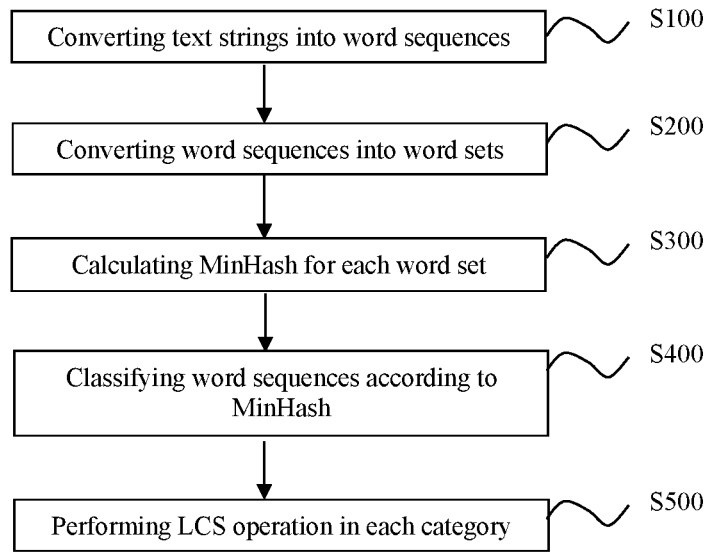
FIG. 1 is a flowchart of a method for determining the longest common subsequence in a plurality of text strings according to the present invention.

Referring to FIG. 1, step S100, the text strings are converted into corresponding word sequences respectively. The following further describes step S100 by way of example using text strings A and B. Assume that the text string A is: "the quick brown fox jumps over the lazy dog"; the text string B is: "the lazy brown dog jumps over the quick fox".

The text string A undergoes word segmentation to obtain a word sequence A: {the, quick, brown, fox, jumps, over, the, lazy, dog}. The text string B undergoes word segmentation to obtain a word sequence B: {the, lazy, brown, dog, jumps, over, the, quick, fox}.

In addition to the text strings based on the Latin alphabet in the above example, the object for word segmentation may also include Chinese text strings, and the schemes for supporting Chinese word segmentation include, for example, CRF, MMSEG, and the like. A simple method of word segmentation is to look up a Chinese word database. For example, using a thesaurus comprising "中华" (Chinese word for "China"), "人民" (Chinese word for "People") and "共和国" (Chinese word for "Republic"), a Chinese-English mixed phrase "how to translate 中华人民共和国" can be subdivided into six words including 'how', 'to', 'translate', "中华", "人民" and "共和国".

The segmentation affects the elemental composition and the length of the word sequence. The longer the length of the word sequence is, the longer the time required for the subsequent execution of the LCS algorithm is. However, it should be pointed out that apart from the speed of LCS operation, the word segmentation basically has no effect on the results of the entire algorithm.

According to step S200, the word sequences are converted into corresponding word sets respectively. Again, the word sequences A and B are used as examples, and in the conversion process, only one of the recurring words is remained, such as "the". After conversion, word set A is [the, quick, brown, fox, jumps, over, lazy, dog]; word set B is [the, lazy, brown, dog, jumps, over, quick, fox].

In the case where there are multiple text strings, all the text strings can be converted into corresponding word sets respectively according to the above steps.

According to step S300, a minimum hash (MinHash) value of each word set is calculated, and the minimum hash value is used to determine the similarity of the two sets. A variety of methods for calculating MinHash are known. Shown below is one of the pseudo-codes implemented based on Python.

```
#!/usr/bin/env python
# -*- coding: utf-8 -*-
```

-continued

```
def minhash(data, hashfuncs):
    # DEBUG = True
    DEBUG = False
    rows, cols, sigrows = len(data), len(data[0]), len(hashfuncs)
    # sigmatrix = [[1000000] * cols] * sigrows
    sigmatrix = [ ]
    for i in range(sigrows):
        sigmatrix.append([10000000] * cols)
    for r in range(rows):
        hashvalue = map(lambda x: x(r), hashfuncs)
        if DEBUG: print hashvalue
        for c in range(cols):
            if DEBUG: print '-' * 2, r, c
            if data[r][c] == 0:
                continue
            for i in range(sigrows):
                if DEBUG: print '-' * 4, i, sigmatrix[i][c],
                    hashvalue[i]
                if sigmatrix[i][c] > hashvalue[i]:
                    sigmatrix[i][c] = hashvalue[i]
                if DEBUG: print '-' * 4, sigmatrix
            if DEBUG:
                for xxxxxxx in sigmatrix:
                    print xxxxxxx
                print '=' * 30
    return sigmatrix
if _name_ == '_main_':
    def hash1(x):
        return (x + 1) % 5
    def hash2(x):
        return (3 * x + 1) % 5
    data = [[1, 0, 0, 1],
            [0, 0, 1, 0],
            [0, 1, 0, 1],
            [1, 0, 1, 1],
            [0, 0, 1, 0]]
    print minhash(data, [hash1, hash2])
```

In step S400, the MinHash distance of any two word sets is calculated. The MinHash is a fixed-length value. Assuming the length is 64 bits, the number of bits with the same position but different values among the 64 bits is the MinHash distance of two MinHash values. Here, the MinHash distance of the two sets being short is a necessary but non-sufficient condition for the similarity of the two sets. This is because MinHash itself is a probabilistic method with false positives. In addition, the MinHash considers only the element set and ignores the order in which the elements appear. Taking the text strings A and B as examples, although the two text strings are different, the corresponding word sets have the same MinHash value.

The MinHash distance is compared with a first threshold, and the word sequences corresponding to the two word sets whose MinHash distances are less than the first threshold are classified into the same category. The first threshold is adjustable, and its default value can be set as 80% of the number of the bits of MinHash. Through step S400, the word sequences corresponding to all text strings are classified into one or more categories.

According to step 500, the longest common subsequence operation is performed in each category. A variety of methods of LCS operations are known. Shown below is one of the pseudo-codes implemented based on Java.

```
publicclassLCSProblem
{
    publicstaticvoidmain(String[ ]args)
    {
        String[ ]x={"","A","B","C","B","D","A","B"};
        String[ ]y={"","B","D","C","A","B","A"};
        int[ ][ ]b=getLength(x,y);
```

-continued

```
Display(b,x,x.length-1,y.length-1);
}
publicstaticint[ ][ ]getLength(String[ ]x,String[ ]y)
{
int[ ][ ]b=newint[x.length][y.length];
int[ ][ ]c=newint[x.length][y.length];
for(inti=1;i<x.length;i++)
{
for(intj=1;j<y.length;j++)
{
if(x[i]==y[j])
{
c[i][j]=c[i-1][j-1]+1;
b[i][j]=1;
}
elseif(c[i-1][j]>=c[i][j-1])
{
c[i][j]=c[i-1][j];
b[i][j]=0;
}
else
{
c[i][j]=c[i][j-1];
b[i][j]=-1;
}
}
}
returnb;
}
publicstaticvoidDisplay(int[ ][ ]b,String[ ]x,inti,intj)
{
if(i==0||j==0)
return;
if(b[i][j]==1)
{
Display(b,x,i-1,j-1);
System.out.print(x[i]+"");
}
elseif(b[i][j]==0)
{
Display (b,x,i-1,j);
}
elseif(b[i][j]==-1)
{
Display (b,x,i,j-1);
}
}
}
```

Step S500 will be described in detail below with reference to FIG. 2.

Figure 2:
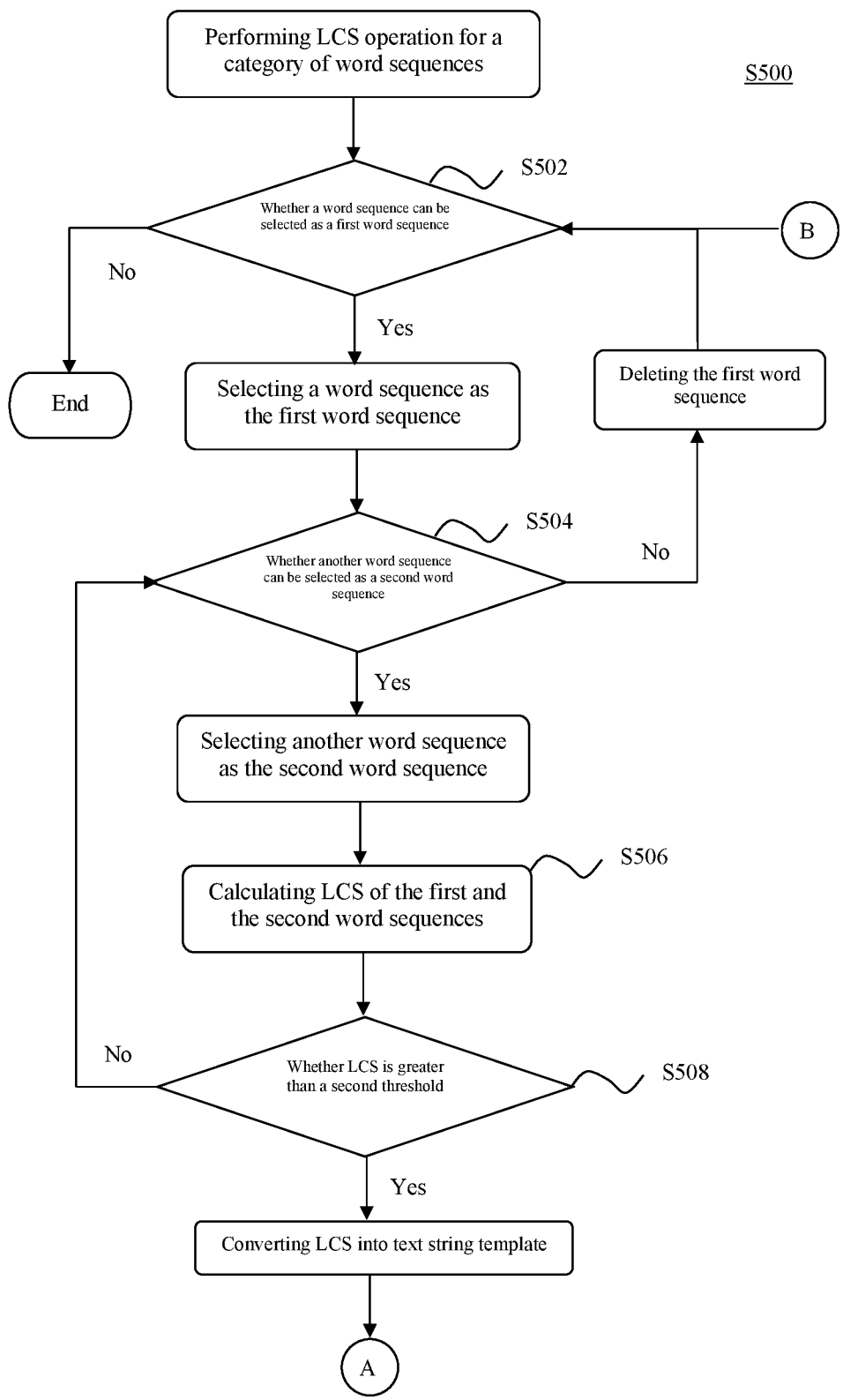
FIG. 2 and FIG. 3 are flowcharts of performing the longest common subsequence operation and determining a text string template according to an embodiment.

Referring to FIG. 2, according to steps S502 to S506, two word sequences are selected from the same category as the first word sequence and the second word sequence, and the longest common subsequence of the first word sequence and the second word sequence is calculated. It should be pointed out that in here and in the following, the selection of word sequences can be arbitrarily performed in a qualified set.

According to step S508, the calculated LCS is compared with a second threshold. If the LCS length is greater than the second threshold, the LCS is converted into a text string template. Here, the second threshold is adjustable, and its default value can be set as 80% of the greater of the length of the first word sequence and the length of the second word sequence. Namely, the ratio of the length of the LCS to the greater of the length of the first word sequence and the length of the second word sequence should be greater than 80%.

If the length of the calculated LCS is not greater than the second threshold, it is returned to step S504 to replace the current second word sequence with another word sequence in the same category, and steps S506 and S508 are repeated. Here, the other word sequence is selected from the word sequences in the category that have not participated in the LCS operation within the operation cycle of the current first word sequence.

Steps S504 to S508 are repeated until a text string template is generated. If it is impossible to generate a template by exhausting all the word sequences in the category (step S504), then the current first word sequence is deleted, and the above step S504 is repeated by selecting a word sequence from the same category as the first word sequence.

The process of generating a text string template is further described below with reference to a specific example of the first word sequence and the second word sequence. For the sake of simplicity, it is assumed that the words in the first and second word sequences are all one letter.

In one case, it is supposed that the first word sequence is {A, B, A, D, E, F, G} and the second word sequence is {A, B, B, D, E, F, G}. After the LCS operation, the LCS of the first word sequence and the second word sequence is {A, B, D, E, F, G} and the length is 6. Since the lengths of the first and second word sequences are both 7, it can be seen that the length of the LCS is greater than the default second threshold of 80%. Therefore, the LCS can be converted into a template {A, B, *, D, E, F, G}, wherein "*" is a placeholder word, meaning that there is at most one word between the words "B" and "D". The placeholder can also use other symbols. To avoid ambiguity, special words that do not appear in the input text are often used.

In another case, it is supposed that the first word sequence is {A, B, D, E, F, G} and the second word sequence is {A, B, B, D, E, F, G}. After the LCS operation, the LCS of the first word sequence and the second word sequence is {A, B, D, E, F, G} and the length is 6. Since the greater of the lengths of the first and the second word sequences is 7, it can be seen that the LCS length is greater than the default second threshold of 80%. Therefore, it is also possible to convert this LCS into a template {A, B, *, D, E, F, G}, wherein "*" is a placeholder word, meaning that there is at most one word between the words "B" and "D".

In another case, the first word sequence is {A, B, A, D, E, F, G} and the second word sequence is {A, B, B, C, E, F, G}. After the LCS operation, the LCS of the first word sequence and the second word sequence is {A, B, E, F, G}, and the length is 5. Since the lengths of the first and second word sequences are both 7, the LCS length is less than the default second threshold of 80%. Therefore, the LCS cannot be converted to a template.

It should be understood that, depending on the actual length of the word sequence, the generated template may include a plurality of placeholder words "*", each of which indicates that a maximum of one word can be inserted in its place.

Figure 3:
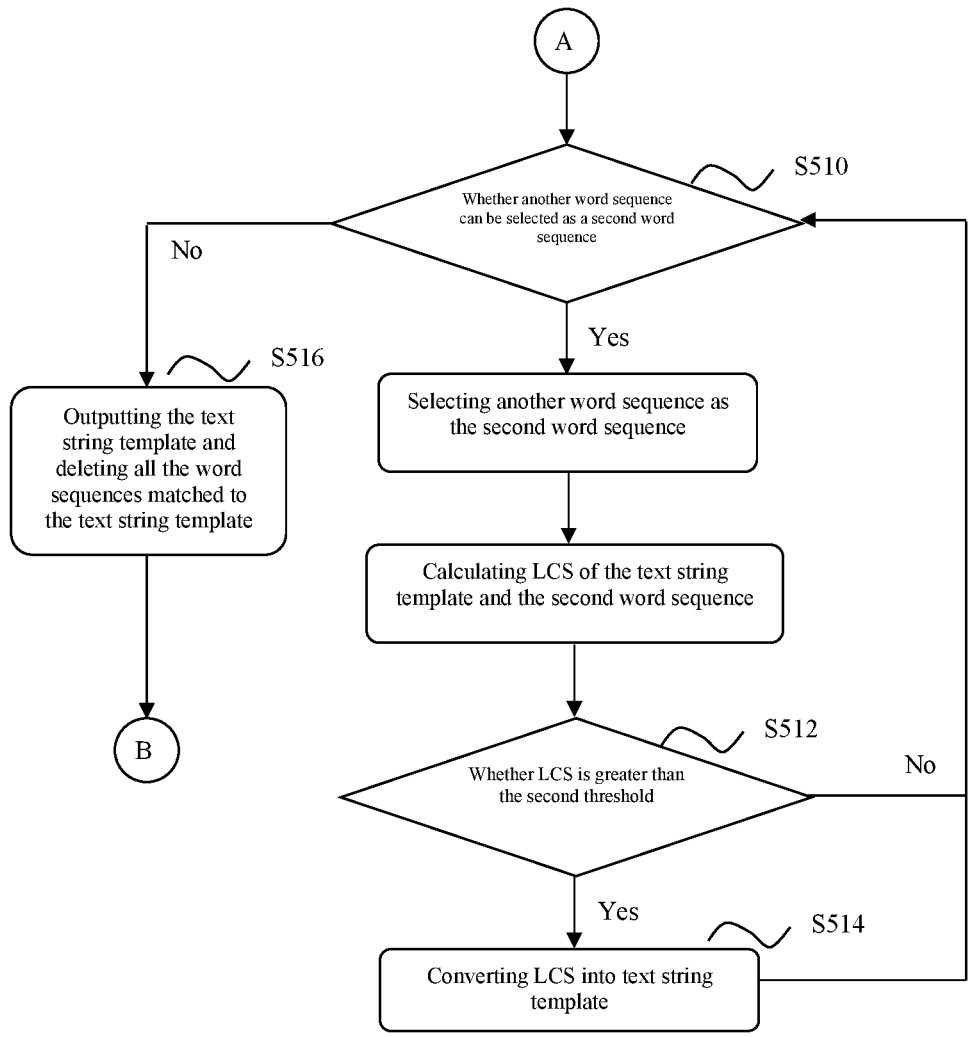

After the text string template is generated, according to steps S510 to S512 in FIG. 3, another word sequence is selected with the text string template for LCS operation. Similar to step S502, the other word sequence is selected from the word sequences in the category that have not participated in the LCS operation within the operation cycle of the current first word sequence. For example, if the LCS calculated from the first and second word sequences has been converted into a text string template, a word sequence in the category other than the current first and second word sequences is selected with the text string template for LCS operation.

According to step S512, the calculated LCS is compared with the second threshold. If the LCS length is greater than the second threshold, the LCS is converted into a new text string template.

If the length of the calculated LCS is not greater than the second threshold, it is retuned to step S510.

Steps S510 to S514 are repeated until all word sequences in this category are exhausted.

According to step S516, the text string template is output, and all the word sequences that the text string template can match are deleted from the category. Alternatively, the deletion of the word sequence with which the text string template can match can also be performed after each time the text string template is obtained.

It is returned to step S502 until the category is empty, that is, all word sequences in the category are deleted.

Similarly, the LCS and text string template operations are performed on other categories until all categories are empty.

Figure 4:
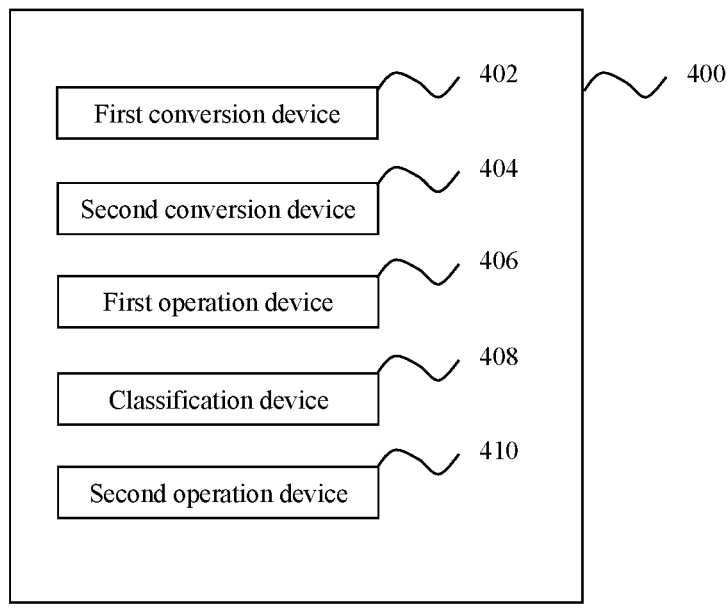
FIG. 4 is a block diagram of an equipment for determining the longest common subsequence among a plurality of text strings according to the present invention.

The equipment 400 for determining the longest common subsequence among a plurality of text strings shown in FIG. 4 comprises a first conversion device 402, a second conversion device 404, a first operation device 406, a classification device 408, and a second operation device 410. Among them, the first conversion device 402 is configured to convert a plurality of the text strings into word sequences respectively, the second conversion device 404 is configured to convert the word sequences into corresponding word sets respectively, the first operation device 406 is configured to calculate the minimum hash value of each word set, the classification device 408 is configured to classify the word sequences according to the minimum hash value, and the second operation device 410 is configured to perform the longest common subsequence operation in each category.

The functional modules of the device 400 may be implemented by hardware, software, or a combination of hardware and software to perform the above-described method steps according to the present invention. In addition, the first conversion device 402, the second conversion device 404, the first operation device 406, the classification device 408, and the second operation device 410 may be combined or further decomposed into sub-modules so as to execute the above-described method steps according to the present invention. Therefore, any possible combination, decomposition or further definition of the above functional modules would fall within the scope of protection of the claims.

The present invention is not limited to the specific description as elaborated above, and any changes that are readily apparent to those skilled in the art on the basis of the above description are within the scope of the present invention.

The invention claimed is:

1. A computer-implemented method for determining a longest common subsequence among a plurality of text strings, comprising:
    converting, by a first conversion device, a plurality of the text strings into word sequences respectively;
    converting, by a second conversion device, the word sequences into corresponding word sets respectively;
    calculating, by an operation device, a minimum hash value for each word set of the corresponding word sets;
    classifying, by a classification device, the word sequences into categories according to the minimum hash value; and
    performing, by the operation device, a longest common subsequence operation in each category,
    wherein two word sequences with a minimum hash distance less than a first threshold are classified into same category,
    wherein the longest common subsequence operation includes: selecting a word sequence in the same category as a first word sequence, and respectively calculating the longest common subsequence of the first word sequence with other word sequences in the same category until a length of the longest common subsequence obtained is greater than a second threshold,
    wherein the longest common subsequence having a length greater than the second threshold is determined as a text string template,
    wherein the text string template is used to calculate the longest common subsequence in turn with other word sequences in the same category, and during the calculation of the longest common subsequence, the longest common subsequence having a length greater than the second threshold is determined as a new text string template and the calculation of the longest common subsequence is continued.

2. The method according to claim 1, wherein the longest common subsequence operation further includes: deleting the first word sequence from the category if all lengths of the longest common subsequences obtained are not greater than the second threshold, and continuing the longest common subsequence operation.

3. The method according to claim 2, wherein the longest common subsequence having a length greater than the second threshold is determined as a text string template.

4. The method according to claim 3, wherein the text string template is used to calculate the longest common subsequence in turn with other word sequences in the category, and during the calculation of the longest common subsequence, the longest common subsequence having a length greater than the second threshold is determined as a new text string template and the calculation of the longest common subsequence is continued.

5. The method according to claim 4, wherein a final text string template is output, and the word sequence in the category which can match the final text string template is deleted.

6. The method according to claim 5, wherein the longest common subsequence operation is continued until the category is empty.

7. The method according to claim 1, wherein a final text string template is output, and a word sequence in the category which can match the final text string template is deleted.

8. The method according to claim 7, wherein the longest common subsequence operation is continued until the category is empty.

9. An apparatus for determining a longest common subsequence among a plurality of text strings, comprising a hardware wherein the hardware is configured to perform following operations including:
    converting, by a first conversion device, a plurality of the text strings into word sequences respectively;
    converting, by a second coversion device, the word sequences into corresponding word sets respectively;
    calculating, by the operation device, a minimum hash value for each word set of the corresponding word sets;
    classifying, by a classification device, the word sequences into categories according to the minimum hash value; and
    performing longest common subsequence operation in each category, wherein two word sequences with a minimum hash distance less than a first threshold are classified into same category, wherein the longest common subsequence operation includes: selecting a word sequence in the same category as a first word sequence, and respectively calculating the longest common subsequence of the first word sequence with other word sequences in the same category until a length of the longest common subsequence obtained is greater than a second threshold, wherein the longest common subsequence having a length greater than the second threshold is determined as a text string template, wherein the text string template is used to calculate the longest common subsequence in turn with other word sequences in the same category, and during the calculation of the longest common subsequence, the longest common subsequence having a length greater than the second threshold is determined as a next text string template and the calculation of the longest common subsequence is continued.

* * * * *